(12) United States Patent
Ou et al.

(10) Patent No.: US 8,831,431 B2
(45) Date of Patent: Sep. 9, 2014

(54) FAST TRANSCEIVER CONTROL INTERFACE

(75) Inventors: Peng Ou, Shenzhen (CN); Zebin Li, Shenzhen (CN); Yuanqiu Luo, Cranbury, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 351 days.

(21) Appl. No.: 13/080,293

(22) Filed: Apr. 5, 2011

(65) Prior Publication Data

US 2011/0249968 A1    Oct. 13, 2011

Related U.S. Application Data

(60) Provisional application No. 61/322,687, filed on Apr. 9, 2010.

(51) Int. Cl.
  *H04B 10/00* (2013.01)
  *H04B 10/40* (2013.01)
  *H04J 14/02* (2006.01)

(52) U.S. Cl.
  CPC ............. *H04B 10/40* (2013.01); *H04J 14/0282* (2013.01); *H04J 14/0221* (2013.01)
  USPC ...................................................... 398/135

(58) Field of Classification Search
  USPC .................................. 398/66, 138
  See application file for complete search history.

(56) References Cited

U.S. PATENT DOCUMENTS

| | | | | |
|---|---|---|---|---|
| 5,500,895 | A * | 3/1996 | Yurgelites | 379/412 |
| 5,737,108 | A * | 4/1998 | Bunch et al. | 398/135 |
| 6,954,592 | B2 * | 10/2005 | Tan et al. | 398/138 |
| 7,194,012 | B2 * | 3/2007 | Mason et al. | 372/38.02 |
| 7,425,836 | B2 * | 9/2008 | Chow et al. | 324/681 |
| 7,848,649 | B2 * | 12/2010 | Maciocco et al. | 398/51 |
| 7,974,537 | B2 | 7/2011 | Li | |
| 7,983,308 | B1 | 7/2011 | Johnston et al. | |
| 2008/0044185 | A1 | 2/2008 | Lee et al. | |
| 2010/0014868 | A1 * | 1/2010 | McGlynn et al. | 398/115 |

FOREIGN PATENT DOCUMENTS

| | | |
|---|---|---|
| CN | 1761181 A | 4/2006 |
| CN | 2814814 Y | 9/2006 |
| CN | 201011717 Y | 1/2008 |
| CN | 101374359 A | 2/2009 |
| CN | 201243290 Y | 5/2009 |
| CN | 201243293 Y | 5/2009 |

(Continued)

OTHER PUBLICATIONS

Foreign Communications from a Counterpart Application, PCT Application PCT/CN2011/072569, International Search Report, Dated Jul. 14, 2011, 4 pages.

(Continued)

*Primary Examiner* — Danny Leung (74) *Attorney, Agent, or Firm* — Conley Rose, P.C.; Grant Rodolph; Jonathan K. Polk (57) ABSTRACT

An apparatus comprising an optical transceiver module. The apparatus also includes an interface coupled to the optical transceiver and comprising a plurality of pins. The interface is configured to communicate a burst data word at a data rate of about one data word within about a shortest burst time based on multiplexing one of a plurality of control and/or monitoring signals onto one of the plurality of pins.

20 Claims, 10 Drawing Sheets

(56) References Cited

FOREIGN PATENT DOCUMENTS

| CN | 201430592 Y | 3/2010 |
|---|---|---|
| JP | 2007020008 A | 1/2007 |
| TW | 200423571 A | 11/2004 |

OTHER PUBLICATIONS

Foreign Communication From a Counterpart Application, PCT Application PCT/CN2011/072569, Written Opinion dated Jul. 14, 2011, 3 pages.

* cited by examiner

FAST TRANSCEIVER CONTROL INTERFACE

CROSS-REFERENCE TO RELATED APPLICATIONS

The present application claims the benefit of U.S. Provisional Patent Application No. 61/322,687 filed Apr. 9, 2010 by Kevin Ou et al. and entitled "Fast Transceiver Control Interface," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over "the last mile." The PON is a point to multi-point network comprised of an optical line terminal (OLT) at the central office, an optical distribution network (ODN), and a plurality of optical network units (ONUs) at the customer premises. In some PON systems, such as Gigabit PON (GPON) systems, downstream data is broadcasted at about 2.5 Gigabits per second (Gbps) while upstream data is transmitted at about 1.25 Gbps. Ten Gbps GPON (XGPON) systems may have a downstream bandwidth of about ten Gbps and an upstream bandwidth of at least about 2.5 Gbps. PON systems may be based on burst mode transmission and reception, and typically involve high speed control signals. Small form-factor pluggable (SFP) and 10 gigabit form-factor pluggable (XFP) transceiver modules are examples of optical transceiver modules used in PON systems. These modules typically have a limited number of interface pins.

SUMMARY

In one embodiment, the disclosure includes an apparatus comprising an optical transceiver module; and an interface coupled to the optical transceiver and comprising a plurality of pins, wherein the interface is configured to communicate a burst data word at a data rate of about one data word within about a shortest burst time based on multiplexing one of a plurality of control and/or monitoring signals onto one of the plurality of pins.

In another embodiment, the disclosure includes a network component. The network component includes an optical transceiver configured to receive and/or transmit a plurality of burst signals; and an optical transceiver interface comprising a plurality of pins and configured to communicate a plurality of burst data words, wherein the burst data word comprises a plurality of fields that are signaled based on multiplexing the plurality of burst signals onto a subset of the plurality of the pins and encoded based on a logical interface, wherein the number of the subset of the plurality of pins is less than the number of the plurality of burst signals.

In a third aspect, the disclosure includes a method. The method includes receiving a burst mode data word; extracting a word from the burst mode data word; parsing the word into a plurality of fields that comprise a plurality of bits associated with at least one of a plurality of control signals and monitoring signals; and decoding the fields based on a Universal Synchronous Receive Transmit (USRT) logical interface configured to match a ten Gigabit per second (Gbps) Gigabit Passive Optical Network (XGPON) system transceiver rate, wherein the USRT logical interface multiplexes the at least one of the plurality of control signals and monitoring signals onto one of a plurality of pins on an optical transceiver interface.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Optical transmissions may occur in bursts of relatively short periods of duration. In GPON systems, the control and/or monitoring of signals may have to occur at short time frames comparable to the burst modes duration, such as on the order of about 100 nanoseconds (ns). The dynamic behavior of burst transmissions, e.g., at the physical layer, and the relatively high communications speed may require control and/or monitoring signals with speeds comparable to the speed of data signals. Control signals may comprise a burst reset signal, a burst transmitter disable signal, a data rate/format select signal, a power level automatic gain control (AGC) select signal, a threshold level select signal, a transmitter power saving signal, and a receiver power saving signal. Monitoring signals may comprise a received power signal, a received data rate signal, a rogue detection signal, and a transmitter not ready signal. Some of the control and/or monitoring signals, such as the data rate/format select signal, may need a non-binary indication, and thus may be represented by more than one bit.

Telecommunications equipment may comprise optical transceiver modules that comprise a plurality of optical components as well as a plurality of associated electronic devices, such as laser drivers, detector pre-amplifiers, and/or data recovery circuitry. Optical transceiver modules may comprise optical and analog circuitry that provide signal processing using simple digital interfaces. Some optical transceiver modules may also comprise a small micro-controller type processor that may be signaled using an interchip interconnect (IIC) bus. However, the IIC bus may have a substantially slow signaling speed that may be used for non-real-time messaging. For example, in a XGPON system, the raw signaling speed of the bus may be ten Megabits per second (Mbps), which may be too slow to support burst transmissions.

Disclosed herein are systems and methods for a relatively fast serial interface, to enable burst mode transmissions. The relatively fast serial interface may use an existing number of interface pins on available modules. The serial interface may follow a simple protocol and use a relatively simple hardware design, for encoding/decoding, e.g., without the need for advanced hardware or circuitry. The serial interface may support a shortest burst time within which a burst data signal, e.g., a word of bits, may be transferred. For example, in one embodiment, the shortest burst time may be about 100 ns. The shortest burst time is the shortest signal duration a PON client equipment (ONU) may send to the PON master equipment (OLT). This shortest burst time is tied to the optical link rate and the protocols running above. The physical parameters of the optical burst transmitter and receiver components determine the shortest burst time a system can support. The serial interface may be based on one or more existing module interface pins by revising the definition of the interface pins of an existing transceiver module to serve a plurality of control and/or monitoring signals using a multiplexing scheme. The clock of the serial interface may be locked to the data signal path clock. In an embodiment, the serial interface may be based on a Universal Synchronous Receive Transmit (USRT) logical interface, which may be similar to a Universal Asynchronous Receive Transmit (UART) logical interface.

Figure 1:
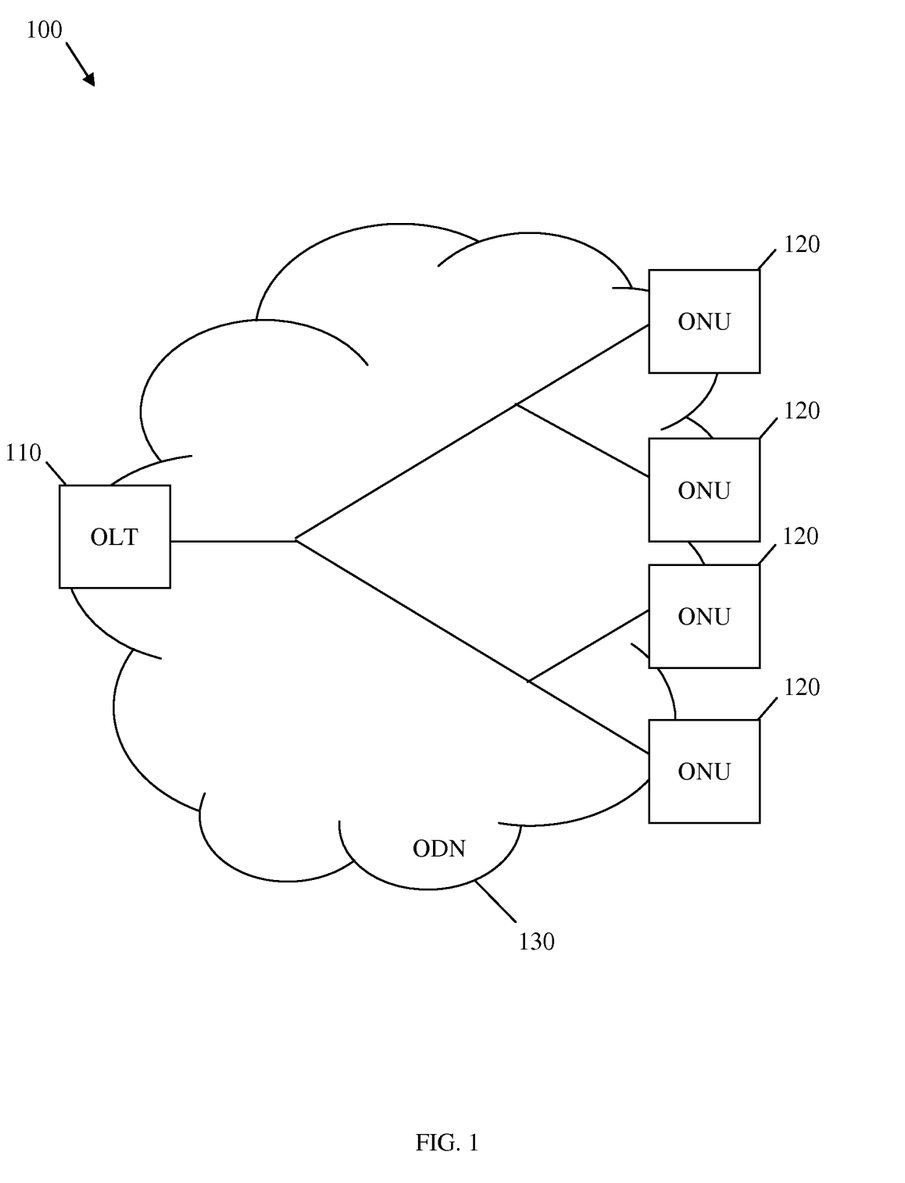
FIG. 1 is a schematic diagram of an embodiment of a PON.

FIG. 1 illustrates one embodiment of a PON 100. The PON 100 comprises an optical line terminal (OLT) 110, a plurality of optical network units (ONUs) 120, and an optical distribution network (ODN) 130, which may be coupled to the OLT 110 and the ONUs 120. The PON 100 may be a communications network that does not require any active components to distribute data between the OLT 110 and the ONUs 120. Instead, the PON 100 may use the passive optical components in the ODN 130 to distribute data between the OLT 110 and the ONUs 120. In an embodiment, the PON 100 may be a Next Generation Access (NGA) system, such as a XGPON, which may have a downstream bandwidth of about ten Gbps and an upstream bandwidth of at least about 2.5 Gbps. Alternatively, the PON 100 may be any Ethernet based network, such as an Ethernet PON (EPON) defined by the IEEE 802.3ah standard, a ten Gigabit EPON as defined by the IEEE 802.3av standard, an asynchronous transfer mode PON (APON), a broadband PON (BPON) defined by the ITU-T G.983 standard, a GPON defined by the International Telecommunication Union (ITU) Standardization Sector (ITU-T) G.984 standard, or a wavelength division multiplexed (WDM) PON (WPON), all of which are incorporated herein by reference as if reproduced in their entirety.

In an embodiment, the OLT 110 may be any device that is configured to communicate with the ONUs 120 and another network (not shown). Specifically, the OLT 110 may act as an intermediary between the other network and the ONUs 120. For instance, the OLT 110 may forward data received from the network to the ONUs 120, and forward data received from the ONUs 120 onto the other network. Although the specific configuration of the OLT 110 may vary depending on the type of PON 100, in an embodiment, the OLT 110 may comprise a transmitter and a receiver. When the other network is using a network protocol, such as Ethernet or Synchronous Optical Networking/Synchronous Digital Hierarchy (SONET/SDH), that is different from the PON protocol used in the PON 100, the OLT 110 may comprise a converter that converts the network protocol into the PON protocol. The OLT 110 converter may also convert the PON protocol into the network protocol. The OLT 110 may be typically located at a central location, such as a central office, but may be located at other locations as well.

In an embodiment, the ONUs 120 may be any devices that are configured to communicate with the OLT 110 and a customer or user (not shown). Specifically, the ONUs 120 may act as an intermediary between the OLT 110 and the customer. For instance, the ONUs 120 may forward data received from the OLT 110 to the customer, and forward data received from the customer onto the OLT 110. Although the specific configuration of the ONUs 120 may vary depending on the type of PON 100, in an embodiment, the ONUs 120 may comprise an optical transmitter configured to send optical signals to the OLT 110 and an optical receiver configured to receive optical signals from the OLT 110. Additionally, the ONUs 120 may comprise a converter that converts the optical signal into electrical signals for the customer, such as signals in the Ethernet or asynchronous transfer mode (ATM) protocol, and a second transmitter and/or receiver that may send and/or receive the electrical signals to a customer device. In some embodiments, ONUs 120 and optical network terminals (ONTs) are similar, and thus the terms are used interchangeably herein. The ONUs may be typically located at distributed locations, such as the customer premises, but may be located at other locations as well.

Another component of the PON 100 may be the ODN 130. The ODN 130 is a data distribution system that may comprise optical fiber cables, couplers, splitters, distributors, and/or other equipment. In an embodiment, the optical fiber cables, couplers, splitters, distributors, and/or other equipment are passive optical components. Specifically, the optical fiber cables, couplers, splitters, distributors, and/or other equipment may be components that do not require any power to distribute data signals between the OLT 110 and the ONUs 120. The ODN 130 typically extends from the OLT 110 to the ONUs 120 in a branching configuration as shown in FIG. 1, but may be alternatively configured in any other configuration.

Figure 2:
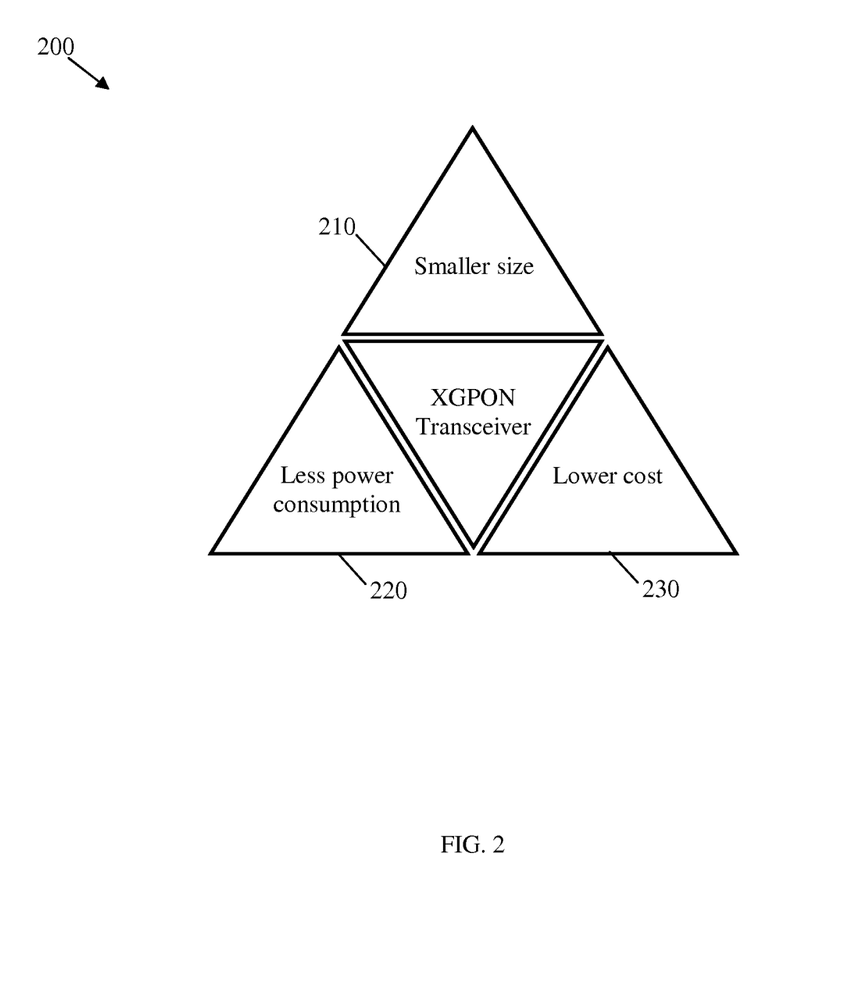
FIG. 2 is a schematic diagram of a XGPON transceiver form factor tradeoff.

The OLT 110 and/or the ONUs 120 may comprise optical transceiver modules that may be designed to reduce size, power consumption, and cost. FIG. 2 illustrates an embodiment of a form factor tradeoff 200 for an optical transceiver, e.g, in a XGPON component. The form factor refers to the size aspect of the optical transceiver, which may be defined by the volume and/or size of logic circuitry in the transceiver. The form factor tradeoff 200 illustrates the tradeoff relationship between size 210, power consumption 220, and cost 230 of the transceiver, e.g, in the OLT 110 or the ONU 120. A desired XGPON transceiver design may be located at a tradeoff compromise region between reducing the size 210, reducing the power consumption 220 and reducing the cost 230. To reduce cost, a transceiver module may be used, which may comprise a limited quantity of interface pins. For example, PON systems may use small-form factor transceiver modules, such as SFP plus (SFP+) transceiver modules and/ or XFP transceiver modules. However, the quantity of pins in such small-form factor transceiver modules may not be sufficient to support burst mode transmission in a PON or GPON system when using a typical or existing pin-based signaling methods. Increasing the quantity of interface pins in the PON or GPON transceivers may support higher burst modes but may increase power consumption and/or increase cost and thus may not de desirable. The cost may increase due to loss of sales volume since the same transceiver design may not be reused for different systems. Alternatively, the optical transceiver module may be redesigned to handle higher burst modes, which may also increase size, and thus power consumption and/or cost.

Figure 3:
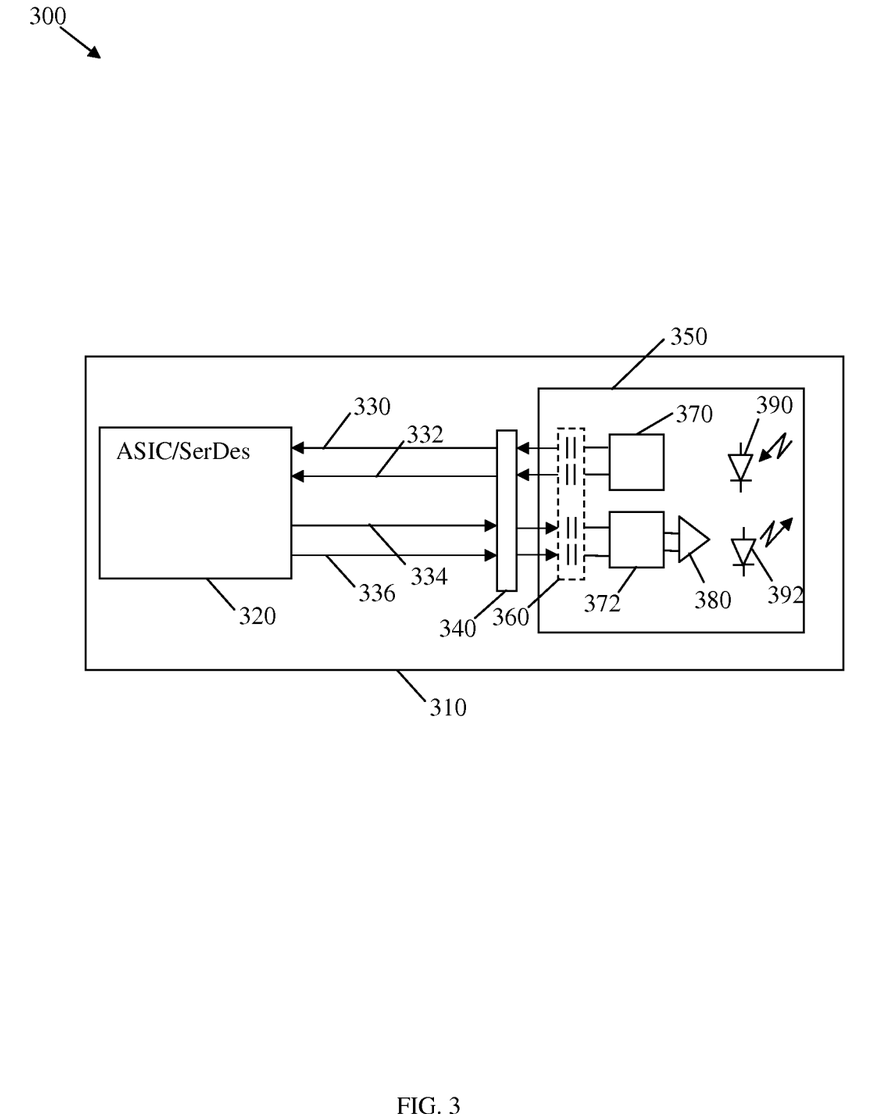
FIG. 3 is a schematic diagram of an embodiment of an application reference model.

FIG. 3 illustrates an embodiment of an application reference model 300 that may be used for an OLT transceiver, e.g., the OLT 110. The application reference model 300 may be used as a basis for an OLT transceiver architecture based on existing form factor and design. The application reference model 300 may comprise a host printed circuit board (PCB) 310 comprising an Application Specific Integrated Circuit (ASIC) serializer/deserializer (ASIC/SerDes) 320, an interface 340, and a XFP transceiver module 350. The XFP transceiver module 350 may comprise a plurality of capacitors 360, a receiver 370, a transmitter 372, a driver 380, a photodetector 390 that may be coupled to the receiver 370, and a laser diode 392 that may be coupled to the transmitter 372. In other embodiments, the application reference model 300 may comprise different quantities of components than shown in FIG. 3. The components of the application reference model 300 may be arranged as shown in FIG. 3.

The host PCB 310 may be part of an OLT transceiver and configured to send and/or receive burst mode signals. The ASIC/SerDes 320 may be coupled to the XFP transceiver module 350 or 370 via the interface 340 to exchange signals 330, 332, 334, 336. For example, the interface 340 may be coupled to the XFP transceiver module 350 or 370 via a bezel. The ASIC/SerDes 320 may comprise a serializer/deserializer component to convert a signal from a serial to a parallel format and vice versa. For example, the ASIC/SerDes 320 may perform format conversion for the received signals 330 and 332 and/or the transmitted signals 334 and 336. The architecture of the XFP transceiver module 350 may be defined by the XFP Multisource Agreement Group.

The interface 340 may use hardware logic for encoding/decoding data, which may rely on relatively simple digital logic. For instance, the interface 340 may comprise a ten Gigabit Small-Form Factor Pluggable interface (XFI), such as the XFI defined by the XFP Multisource Agreement Group. The interface 340 may comprise a standard low voltage digital signaling (LVDS) physical interface to reduce crosstalk and interference and decrease radiation interference to neighboring circuits. For example, the interface 340 may be implemented using gates and/or flip-flops. The interface 340 may also implement a bit-mapped register transfer protocol on the links between the ASIC/SerDes 320 and the XFP transceiver module 350. Specifically, the interface 340 may communicate with the ASIC/SerDes 320 and/or the XFP transceiver module 350 a plurality of burst data words, which may each comprise a plurality of encoded fields, at a plurality of relatively fast subsequent time periods. For instance, each burst data word may be forwarded within about 103 ns and may comprise about 30 bits. Each of the encoded fields in the burst data word may comprise one or more bits that may be associated with a burst control and/or monitoring signal, such as the control and/or monitoring signals described above for GPON systems.

The capacitors 360 may be configured to properly condition or smooth the incoming signals, e.g., by blocking direct current (DC). The photodetector 390 may be configured to receive a burst mode signal that comprises a burst data word that may then be forwarded to the receiver 370. The receiver 370 may be configured to receive the burst data word from the photodetector 390 and pass it to the interface 340 to extract a word from the burst data word, parse the word into a plurality of encoded fields, and then decode each field according to its type and purpose. The transmitter 372 may be configured to encode a plurality of fields, pack the fields into a burst data word and transmit the burst data word to the driver 380. The driver 380 may be configured to properly amplify a burst mode signal that comprises the burst data word from the transmitter 372 before sending the signal to the laser diode 392. The laser diode 392 may be configured to transmit the burst mode signal from the driver 380. In other embodiments, the application reference model 300 may comprise different quantities of components than shown in FIG. 3.

In an embodiment, the interface 340 may correspond to a USRT logical interface that is similar to a UART interface. The USRT logical interface may have a data rate of about 311.04 Mbps, which may be about one eighth of a PON or GPON line data rate. The USRT logical interface may transfer a word comprising about 30 bits within about 103 ns or less. The USRT interface may have a clock that may be locked to the clock of the data path or link associated with the interface 340. As such, once about every 103 ns, the link may transfer about 32 bits of information. The 32 bits may comprise about one start bit to indicate the start of a sequence of bits and about one end bit to indicate the end of the sequence of bits. Thus, about 30 bits of information may be transferred about every 103 ns. This data rate may be suitable to control and/or monitor data burst modes in PONs, GPONs, or XGPONs.

Figure 4:
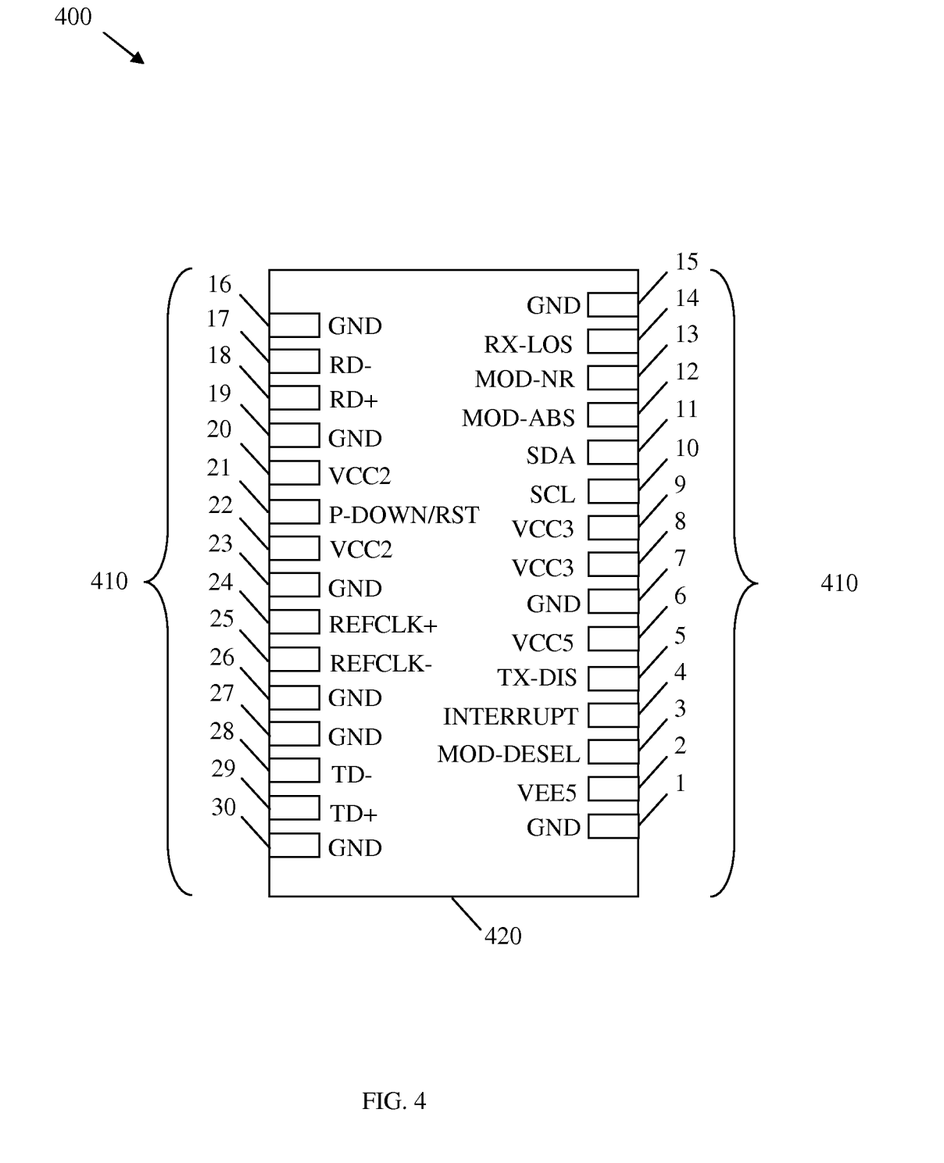
FIG. 4 is a schematic diagram of an embodiment of an interface pinout.

FIG. 4 illustrates an embodiment of an interface pinout 400 that may be used in the interface 340. The interface pinout 400 may comprise about 30 pins 410 on a XFI interface chip 420. In FIG. 4, the pins 410 are labeled and numbered as in the case of a typical XFI interface. For instance, the pins 410 may comprise an optional −5.2 Volt power supply (VEE5) pin 2 and a receiver loss of signal indicator (RX-LOS) pin 14. To support burst mode transmission, at least one of the pins 410 be re-assigned. One or more pins may be reassigned by changing the signaling purpose of a pin and/or representing at least one non-binary signal via one or more pins. In an embodiment, the signaling of the VEE5 pin 2 may be changed to indicate a burst reset signal. The signaling of the RX-LOS pin 14 may also be changed to signal a combined receiver loss of signal indicator and received signal strength indicator. The new signaling of the RX-LOS pin 14 may correspond to a receiver loss of signal indicator multiplexed with a received signal strength indicator.

Figure 5:
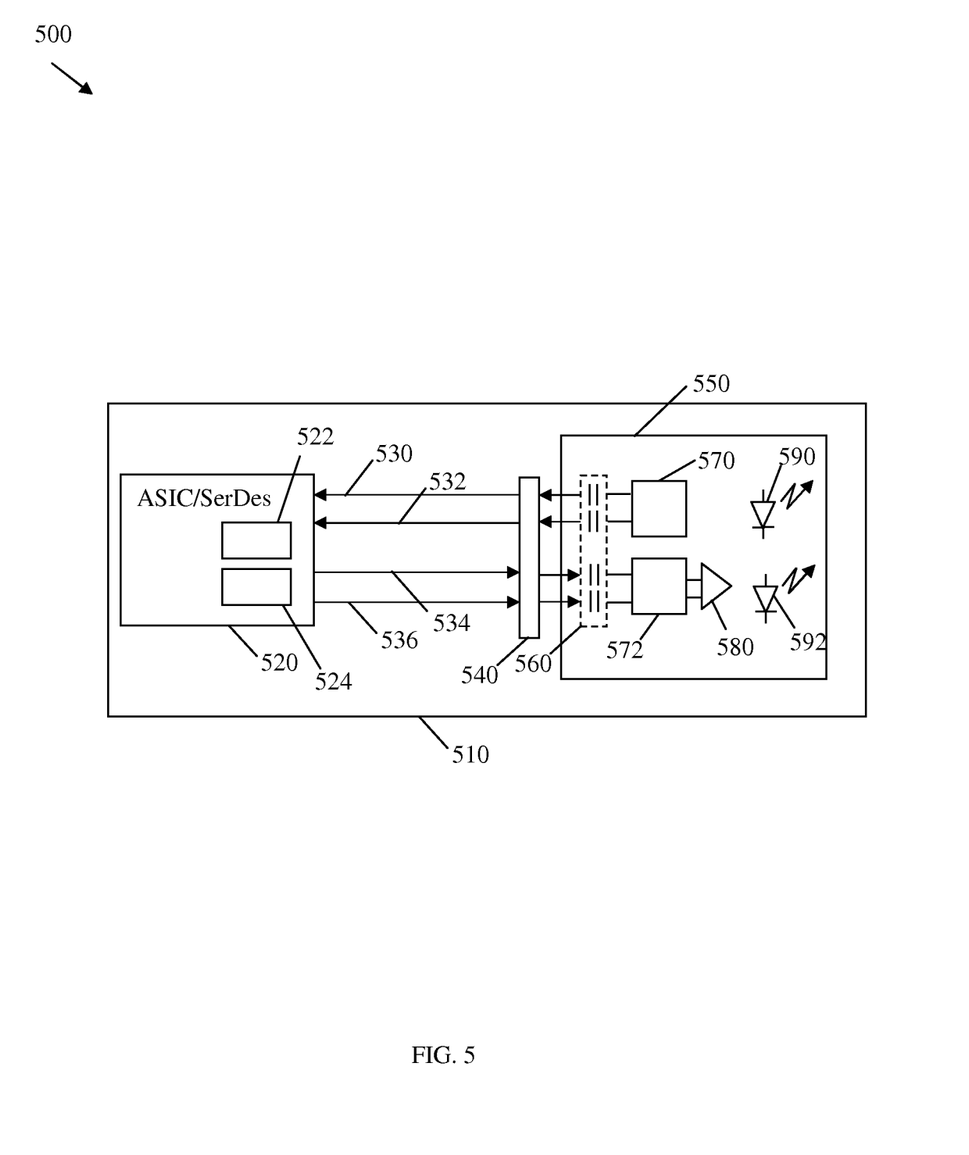
FIG. 5 is a schematic diagram of another embodiment of an application reference model.

FIG. 5 illustrates an embodiment of an application reference model 500 that may be used for an ONU transceiver, e.g., the ONU 120. The application reference model 500 may be used as a basis for an ONU transceiver architecture based on an existing form factor and design. The application reference model 500 may comprise a host PCB 510 comprising an ASIC/SerDes 520, an interface 540, and a XFP transceiver module 550. The ASIC/SerDes 520 may comprise an Electronic Dispersion Compensator (EDC) equalizer 522 and a pre-emphasis block 524. The SFP+ transceiver module 550 may comprise a plurality of capacitors 560, a receiver 570, a transmitter 572, a driver 580, a first antenna 590 that may be coupled to the receiver 570, and a second antenna 592 that may be coupled to the transmitter 572. The components of the application reference model 500 may be arranged as shown in FIG. 5. In other embodiments, the application reference model 500 may comprise different quantities of components than shown in FIG. 5.

The host PCB 510 may be part of an ONU and configured to send and/or receive burst mode signals. The EDC equalizer 522 in the ASIC/SerDes 520 may be configured to account for a plurality of trace characteristics of the host PCB 510. The pre-emphasis block 524 in the ASIC/SerDes 520 may be configured to mitigate signal degradation introduced at the host PCB 510. The ASIC/SerDes 520 may be coupled to the SFP+ transceiver module 550 via the interface 540 to exchange signals 530, 532, 534, 536. The architecture of the SFP+ transceiver module 550 may be defined by the SFP Multisource Agreement Group. The interface 540 may use hardware logic for encoding/decoding data, which may be relatively simple digital logic. For instance, the interface 540 may comprise a Small-Form Factor Pluggable interface (SFI) such as the SFI defined by the SFP Multisource Agreement Group. The remaining components of the application reference model 500 may be configured substantially similar to the corresponding components of the application reference model 300.

Figure 6:
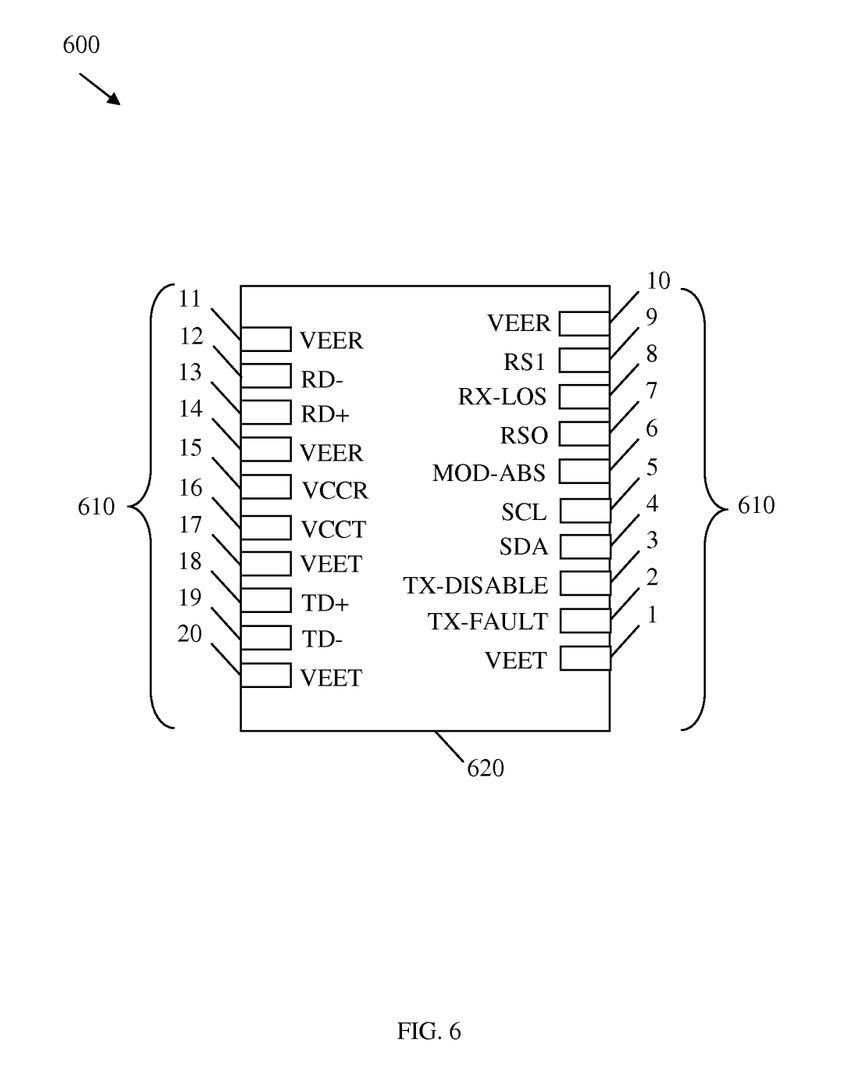
FIG. 6 is a schematic diagram of another embodiment of an interface pinout.

FIG. 6 illustrates an embodiment of an interface pinout 600 that may be used in the interface 540. The interface pinout 600 may comprise about 20 pins 610 on a SFI interface chip 620. In FIG. 4, the pins 610 are labeled and number as in the case of a typical SFI interface. For instance, the pins 610 may comprise a transmitter disable (TX-DISABLE) pin 3 and a RX-LOS pin 8. To support burst mode transmission, at least one of the pins 610 be re-assigned. One or more pins may be reassigned by changing the signaling purpose of a pin and/or representing at least one non-binary signal via one or more pins. In an embodiment, the signaling of the TX-DISABLE pin 3 may be changed to indicate a burst transmitter disable signal. The signaling of the RX-LOS pin 8 may be changed to signal a combined receiver loss of signal indicator and received signal strength indicator. The new signaling of the RX-LOS pin 8 may correspond to a receiver loss of signal indicator multiplexed with a received signal strength indicator.

Figure 7:
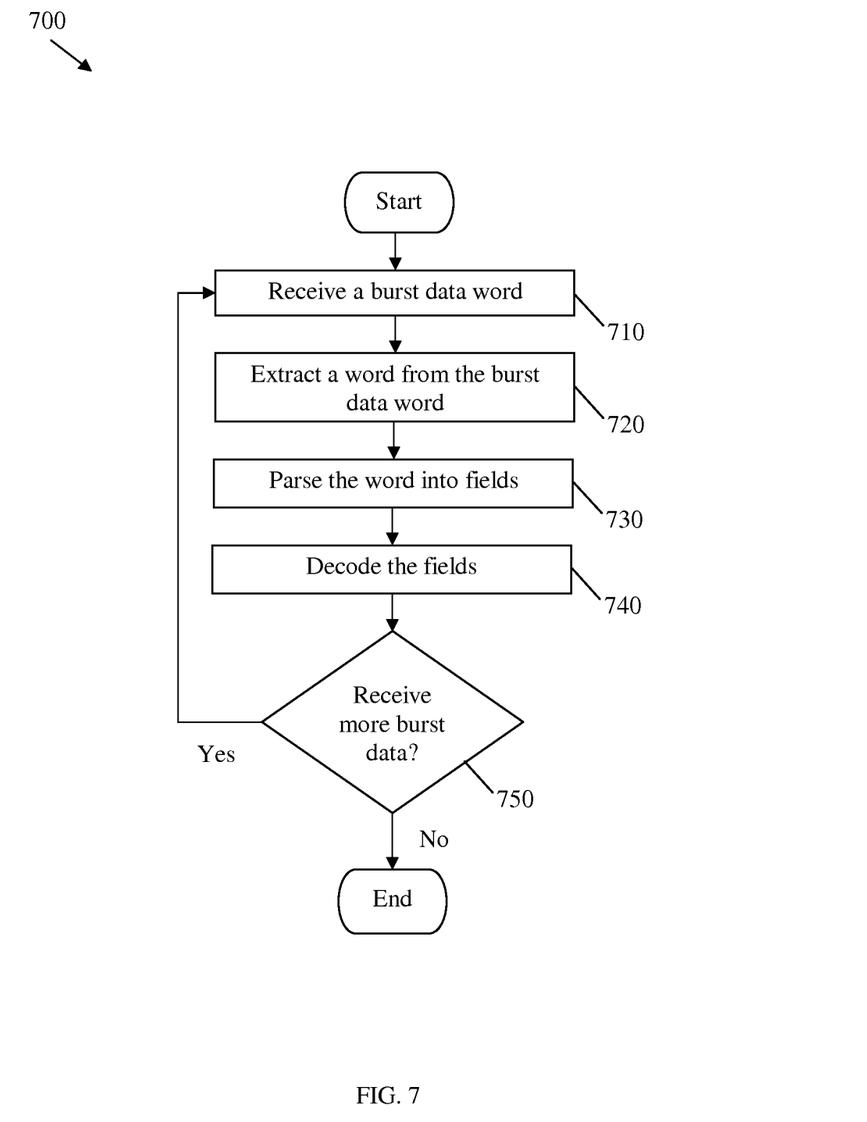
FIG. 7 is a flowchart of a burst data reception method.

FIG. 7 illustrates an embodiment of a burst data reception method 700, which may be implemented by an optical transceiver interface to receive a plurality of burst data words that comprise one or more control and/or monitoring signals. For instance, the burst data reception method 700 may be implemented in the interface 340 in the OLT 110 based on the interface pinout 400. Alternatively, the burst data reception method 700 may be implemented in the interface 540 in the ONU 120 based on the interface pinout 600. The method 700 may begin at block 710, where a burst data word may be received. The burst data word may be received by an OLT 110 via a XFI interface 420 or by an OUN 120 via a SFI interface 620. At block 720, a word may be extracted, which may comprise about 30 bits. Extracting the word may comprise removing a standardized header from the received burst data word and/or removing a start bit and end bit from the received burst data word. At block 730, the word may be parsed into a plurality of fields. For example, the word may be parsed into a plurality of one-bit fields and a plurality of two-bit fields, where each field may be associated with a control and/or monitoring signal. At block 740, the fields may be decoded. A decoded field may comprise one or more control and/or monitoring signals that may be forwarded to a host component to control and/or monitor a plurality of data path operations. Next, at block 750, the method 700 may verify whether to receive more burst data. If the condition in block 750 is met, e.g., if more data words are detected, the method 700 may return to block 710. Otherwise, the method 700 may end.

Figure 8:
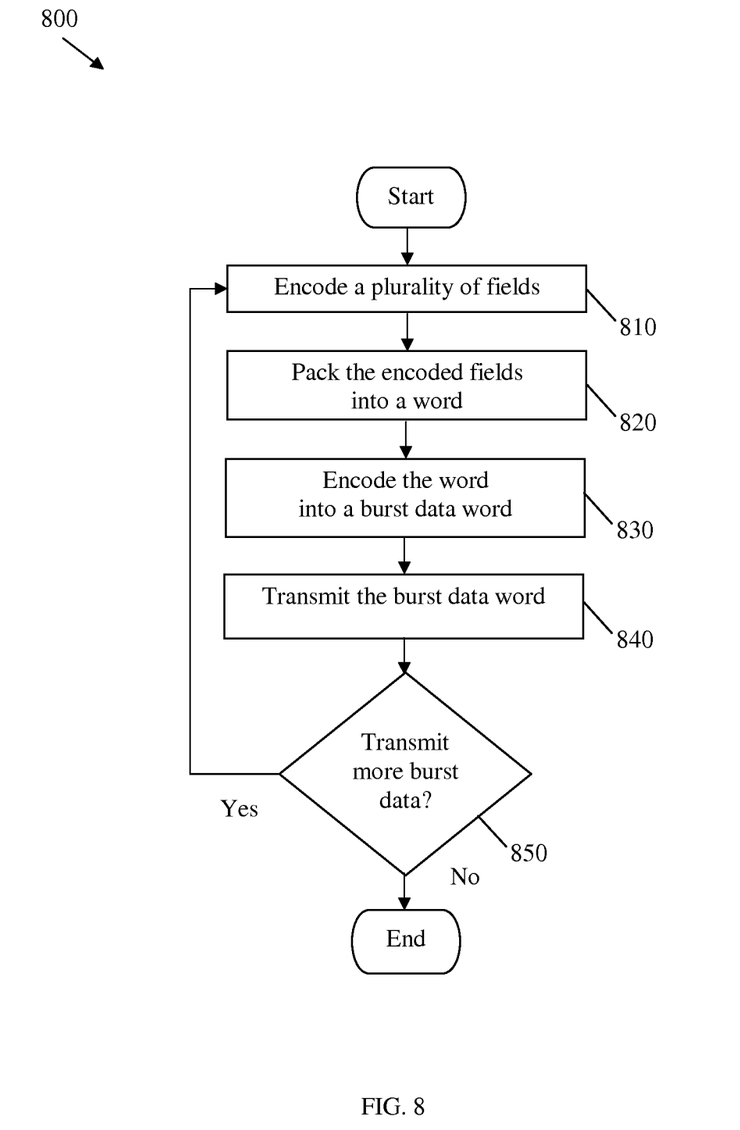
FIG. 8 is a flowchart of a burst data transmission method.

FIG. 8 illustrates an embodiment of a burst data transmission method 800, which may be implemented by an optical transceiver interface to transmit a plurality of burst data words that comprise a plurality of control and/or monitoring signals. For instance, the burst data transmission method 800 may be implemented in the interface 340 in the OLT 110 based on the interface pinout 400. Alternatively, the burst data transmission method 800 may be implemented in the interface 540 in the ONU 120 based on the interface pinout 600. The method 800 may begin at block 810, where a plurality of fields may be encoded. The fields may comprise a plurality of control and/or monitoring signals. At block 820, the encoded fields may be combined into a word, which may comprise about 30 bits. At block 830, the word may be encoded into a burst data word. Encoding the word may comprise adding a standardized header to the word and/or adding a start bit and an end bit to the word. At block 840, the burst data word may be transmitted. The burst data word may be transmitted by an OLT via an XFI interface or by an ONU via an SFI interface. At block 850 the method 800 may verify whether to transmit more burst data, e.g., in a sequence of burst data. If the condition in block 850 is met, then the method 800 may return to block 810. Otherwise, the method 800 may end.

Figure 9:
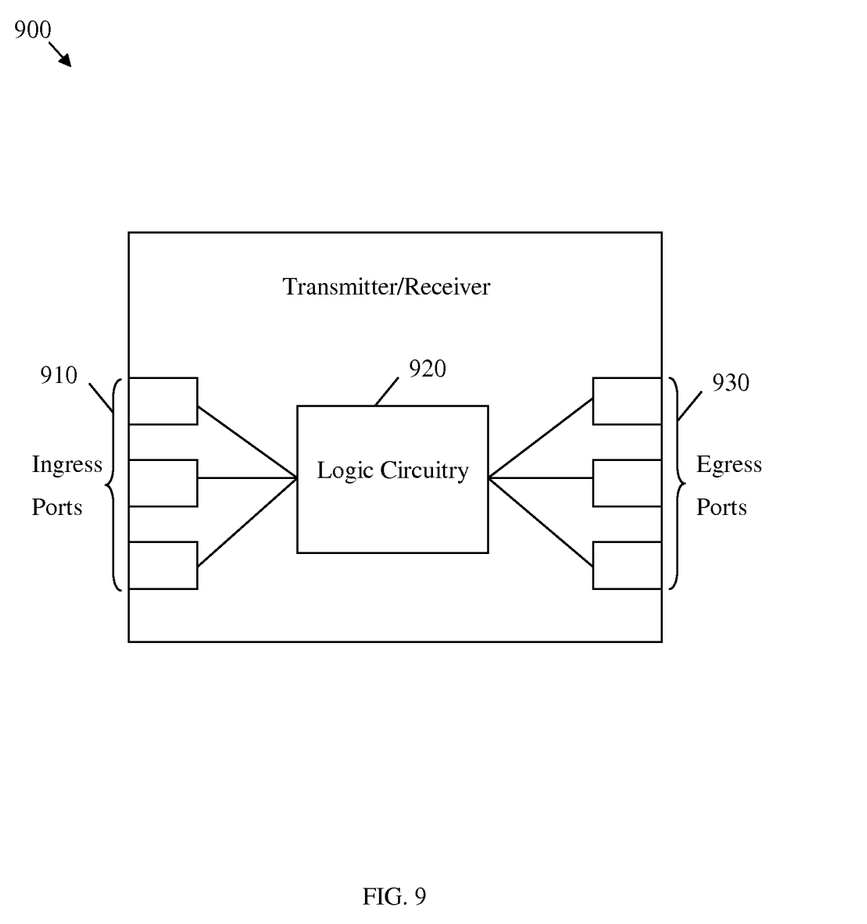
FIG. 9 is a schematic diagram of an embodiment of a transmitter/receiver unit.

FIG. 9 illustrates an embodiment of a transmitter/receiver unit 900, which may be any device that transports data through a network. For instance, the transmitter/receiver unit 900 may be located in the OLT 110 or the ONU 120 in the schemes described above. The transmitted/receiver unit 900 may comprise one or more ingress ports or units 910 for receiving sequences of data that comprise bits or words, e.g., in a burst mode transmission, logic circuitry 920 to perform transceiver data operations, and one or more egress ports or units 930 for transmitting the data to other network components. The logic circuitry 920 may also comprise simple logic to perform control and/or data monitor, as described in the schemes above. For instance, the logic circuitry may comprise or correspond to the interface 340 or 540.

Figure 10:
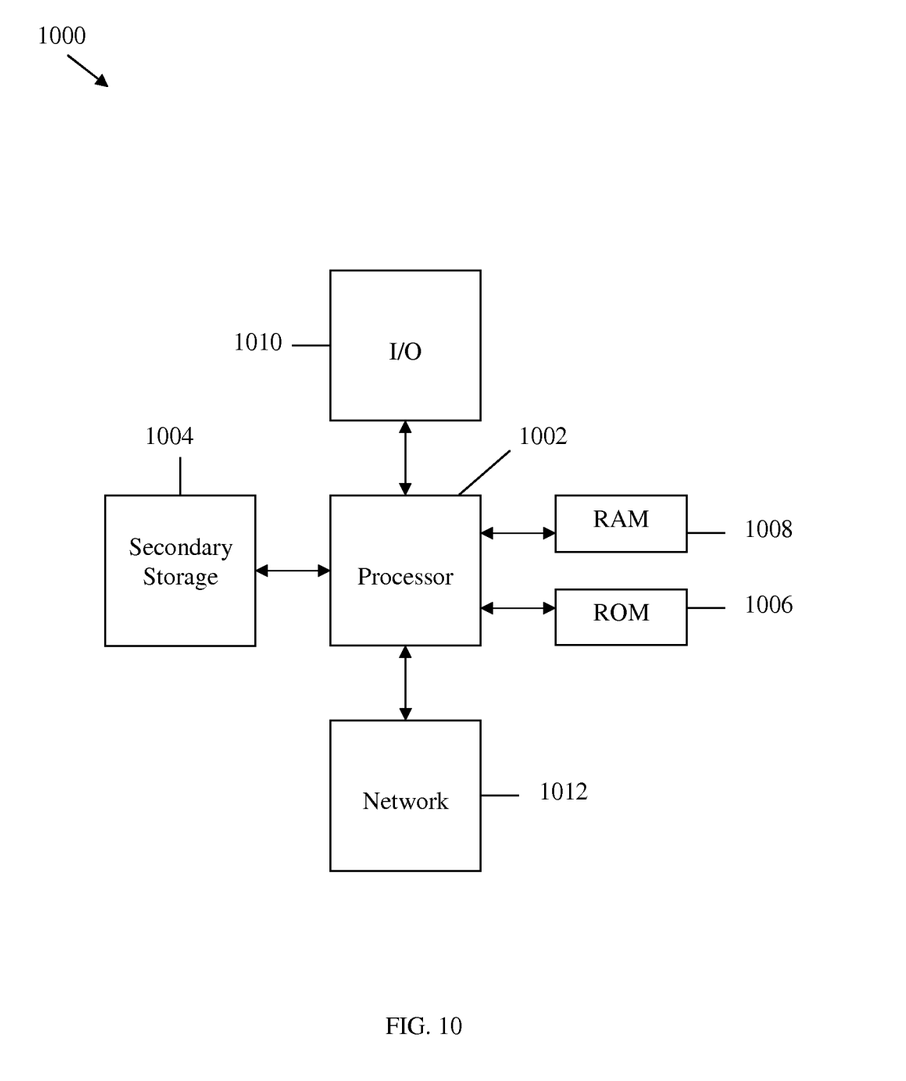
FIG. 10 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 10 illustrates a typical, general-purpose network component 1000 suitable for implementing one or more embodiments of the components disclosed herein. The network component 1000 includes a processor 1002 (which may be referred to as a central processor unit or CPU) that is in communication with memory devices including secondary storage 1004, read only memory (ROM) 1006, random access memory (RAM) 1008, input/output (I/O) devices 1010, and network connectivity devices 1012. The processor 1002 may be implemented as one or more CPU chips, or may be part of one or more ASICs.

The secondary storage 1004 is typically comprised of one or more disk drives or tape drives and is used for non-volatile storage of data and as an overflow data storage device if RAM 1008 is not large enough to hold all working data. Secondary storage 1004 may be used to store programs that are loaded into RAM 1008 when such programs are selected for execution. The ROM 1006 is used to store instructions and perhaps data that are read during program execution. ROM 1006 is a non-volatile memory device that typically has a small memory capacity relative to the larger memory capacity of secondary storage 1004. The RAM 1008 is used to store volatile data and perhaps to store instructions. Access to both ROM 1006 and RAM 1008 is typically faster than to secondary storage 1004.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 5, 4, etc.; greater than 0.10 includes 0.11, 0.12, 0.15, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 5 percent, 4 percent, 5 percent, . . . , 50 percent, 51 percent, 52 percent, . . . , 75 percent, 76 percent, 77 percent, 78 percent, 77 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
   an optical transceiver module comprising:
      capacitors,
      a transmitter coupled to the capacitors,
      a driver coupled to the transmitter, and
      a receiver coupled to the capacitors;
   an interface coupled to the optical transceiver module and comprising pins, wherein the pins comprise a −5.2 Volt power supply (VEE5) pin reassigned to provide a burst mode reset signal; and
   an application-specific integrated circuit serializer/deserializer (ASIC/SerDes) coupled to the interface.

2. The apparatus of claim 1, wherein the pins comprise a receiver loss of signal indicator (RX-LOS) pin reassigned to provide a combined receiver loss of signal indicator and received signal strength indicator.

3. The apparatus of claim 2, wherein the apparatus is an optical line terminal (OLT).

4. An apparatus comprising:
   an optical transceiver module comprising:
      capacitors,
      a transmitter coupled to the capacitors,
      a driver coupled to the transmitter, and
      a receiver coupled to the capacitors;
   an interface coupled to the optical transceiver module and comprising pins, wherein the pins comprise a transmitter disable (TX-DISABLE) pin reassigned to provide a burst mode transmission disable signal; and
   an application-specific integrated circuit serializer/deserializer (ASIC/SerDes) coupled to the interface.

5. The apparatus of claim 4, wherein the pins comprise a receiver loss of signal indicator (RX-LOS) pin reassigned to provide a combined receiver loss of signal indicator and received signal strength indicator.

6. The apparatus of claim 5, wherein the apparatus is an optical network unit (ONU).

7. An apparatus comprising:
   an optical transceiver module comprising:
      capacitors,
      a transmitter coupled to the capacitors,
      a driver coupled to the transmitter, and
      a receiver coupled to the capacitors;
   an interface coupled to the optical transceiver module and comprising pins reassigned to enable burst signal communication; and
   an application-specific integrated circuit serializer/deserializer (ASIC/SerDes) coupled to the interface.

8. The apparatus of claim 7, wherein the pins are configured to communicate a burst signal in about 103 nanoseconds (ns) using multiplexing and/or demultiplexing.

9. The apparatus of claim 8, wherein the multiplexing and/or demultiplexing occurs on at least one of a receiver loss of signal indicator (RX-LOS) pin, a −5.2 volt power supply (VEE5) pin, and a transmitter disable (TX-DISABLE) pin.

10. The apparatus of claim 8, wherein the burst signal comprises control and/or monitoring signals.

11. The apparatus of claim 10, wherein the control signals comprise at least one of:
   a burst reset signal;
   a burst transmitter disable signal;
   a data rate/format select signal;
   a power level automatic gain control (AGC) select signal;
   a threshold level select signal;
   a transmitter power saving signal; and
   a receiver power saving signal.

12. The apparatus of claim 10, wherein the monitoring signals comprise at least one of:
a received power signal;
a received data rate signal;
a rogue detection signal; and
a transmitter not ready signal.

13. The apparatus of claim 7, wherein the pins are configured to communicate a burst signal in about 100 nanoseconds (ns) using multiplexing and/or demultiplexing.

14. The apparatus of claim 7, wherein the apparatus is an optical line terminal (OLT), the optical transceiver module is a 10 Gigabit Small-Form Factor Pluggable (XFP) transceiver module, and the interface is an XFP interface (XFI).

15. The apparatus of claim 7, wherein the apparatus is an optical network unit (ONU), the optical transceiver module is an Enhanced Small-Form Factor Pluggable (SFP+) transceiver module, and the interface is an SFP+ interface (SFI).

16. The apparatus of claim 15, wherein the ASIC/SerDes comprises:
an electronic dispersion compensator (EDC) equalizer; and
a pre-emphasis block coupled.

17. The apparatus of claim 7, wherein the optical transceiver module further comprises:
a photodetector coupled to the receiver; and
a laser diode coupled to the driver.

18. The apparatus of claim 7, wherein the optical transceiver module further comprises:
a first antenna coupled to the receiver; and
a second antenna coupled to the driver.

19. The apparatus of claim 3, wherein the optical transceiver module is a 10 Gigabit Small-Form Factor Pluggable (XFP) transceiver module and the interface is an XFP interface (XFI).

20. The apparatus of claim 6, wherein the optical transceiver module is an Enhanced Small-Form Factor Pluggable (SFP+) transceiver module and the interface is an SFP+ interface (SFI).

* * * * *